(12) United States Patent
Yamauchi et al.

(10) Patent No.: US 11,322,014 B2
(45) Date of Patent: May 3, 2022

(54) NOTIFICATION DEVICE, NOTIFICATION METHOD, AND PROGRAM

(71) Applicant: Mitsubishi Power, Ltd., Kanagawa (JP)

(72) Inventors: Takahiro Yamauchi, Yokohama (JP); Koji Imakita, Yokohama (JP); Akihisa Endo, Yokohama (JP); Toru Tanaka, Yokohama (JP); Yoshiyuki Nagata, Kanagawa (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 0 days.

(21) Appl. No.: 17/260,424

(22) PCT Filed: Jul. 4, 2019

(86) PCT No.: PCT/JP2019/026578
§ 371 (c)(1),
(2) Date: Jan. 14, 2021

(87) PCT Pub. No.: WO2020/031571
PCT Pub. Date: Feb. 13, 2020

(65) Prior Publication Data
US 2021/0248899 A1 Aug. 12, 2021

(30) Foreign Application Priority Data
Aug. 7, 2018 (JP) .............................. JP2018-148623

(51) Int. Cl.
*G08G 1/137* (2006.01)
*G08B 21/18* (2006.01)
*G05B 23/02* (2006.01)

(52) U.S. Cl.
CPC ....... *G08B 21/187* (2013.01); *G05B 23/0254* (2013.01); *G05B 23/0272* (2013.01)

(58) Field of Classification Search
CPC .............. G08B 21/187; G05B 23/0254; G05B 23/0272; G05B 23/0275; G05B 23/0286; G05B 23/0243
See application file for complete search history.

(56) References Cited

U.S. PATENT DOCUMENTS 5,247,433 A * 9/1993 Kitaura .................. G06F 3/011
376/216
6,523,038 B1 * 2/2003 Iida ..................... G05B 23/0267
(Continued)

FOREIGN PATENT DOCUMENTS

| JP | 6-332529 | 12/1994 |
| JP | 8-152912 | 6/1996 |

(Continued)

OTHER PUBLICATIONS

International Search Report dated Sep. 24, 2019 in International (PCT) Application No. PCT/JP2019/026578 with English-language translation.

(Continued)

*Primary Examiner* — Munear T Akki
(74) *Attorney, Agent, or Firm* — Wenderoth, Lind & Ponack, L.L.P.

(57) ABSTRACT

A notification device is provided with: an abnormality estimation unit for estimating a state relating to an abnormality of a plant and a factor relating to the abnormality of the plant; an item specifying unit for specifying inspection items on the basis of the abnormality of the plant and the state relating to the factor relating to the abnormality of the plant estimated by the abnormality estimation unit; a notification unit for notifying of the inspection items specified by the item specifying unit; a stop-time item specifying unit for specifying the inspection items which should be checked at a time of a stop out of the inspection items specified by the item specifying unit; a check result acquisition unit for (Continued)

receiving a check result for the inspection items notified of by the notification unit; and a stop-time item output unit for outputting the inspection items which should be checked at the time of stop.

14 Claims, 13 Drawing Sheets

(56) References Cited

U.S. PATENT DOCUMENTS

2007/0297557 A1* 12/2007 Kuwatani .......... G05B 19/0428
376/259
2012/0290879 A1 11/2012 Shibuya et al.

FOREIGN PATENT DOCUMENTS

| JP | 9-146631 | 6/1997 |
| JP | 11-110036 | 4/1999 |
| JP | 2000-305619 | 11/2000 |
| JP | 2014-92799 | 5/2014 |
| JP | 2015-172945 | 10/2015 |
| JP | 2016-99983 | 5/2016 |
| WO | 2018/097062 | 5/2018 |

OTHER PUBLICATIONS

International Preliminary Report on Patentability and Written Opinion of The International Searching Authority dated Sep. 24, 2019 in International (PCT) Application No. PCT/JP2019/026578, with English-language translation.

* cited by examiner

FIG. 4

| PLANT | FACTOR | INSPECTION ITEM — TBL1 |
|---|---|---|
| A | FACTOR 1 | ITEM 1a |
| | | ITEM 2a |
| | | ... |
| | FACTOR 2 | ITEM 1a |
| | | ITEM 1b |
| | | ITEM 2b |
| | | ... |
| B | ... | ... |
| ... | ... | ... |

FIG. 5

Sep-21-2017 XX:XX

✉ MESSAGE   📄 Image_ESK1.png (72KB)   📄 DataGraph_ESK1.xlsm (2MB)

\*\*\*\*\*\*\*\*

\*\*\*\*\*\*\*\*\*\*\*\*\*\*\*\*\*\*\*\*\*\*
\*\*\*\*\*\*\*\*\*\*\*\*.

\*\*\*\*\*\*\*\*10/12/2017 12:00

URL:https://www.\*\*\*\*\*\*.\*\*\*\*\*\*\*\*\*\*\*\*.\*\*\*/

\*\*\*\*\*\*\*\* (\*\*\*\*) \*\*\*\*.

| \*\*\*\*\*\* | \*\*\* |
|---|---|
| (\*\*\*\*\*\*\*\*\*\*\*\*\*\*\*\*\*\*\*\*\*\*) | 3.24824 |
| (\*\*\*\*\*\*\*\*\*\*\*\*\*\*\*\*\*\*\*\*\*\*) | 0.8581273 |
| \*\*\*\*\*\*\*\*\*\*\*\*\*\*\*\*\*\*\*\*\*\* | 0.7842785 |
| (\*\*\*\*\*\*\*\*\*\*\*\*\*\*\*\*\*\*\*\*\*\*) | 0.7530323 |
| \*\*\*\*\*\*\*\*\*\*\*\*\*\*\*\*\*\*\*\* (\*\*\*\*\*\*\*\*\*\*\*\*\*\*\*\*) | 0.5381138 |

\*\*\*\*\*\*\*\*\*\*\*\* (\*\*\*\*) \*\*\*\*.

| \*\*\*\*\*\* | \* |
|---|---|
| \*\*\*\*\*\*\*\*\*\*\*\*\*\*\*\*\*\*\*\* [\*] | 2.320142 |
| \*\*\*\*\*\*\*\*\*\*\*\*\*\*\*\*\*\*\*\*\*\* [\*] | 2.124003 |
| \*\*\*\*\*\*\*\*\*\*\*\*\*\*\*\*\*\* [\*] | 1.130773 |
| \*\*\*\*\*\*\*\*\*\*\*\* [\*] | 0.9004328 |
| \*\*\*\*\*\*\*\*\*\*\*\*\* [\*] | 0.8320038 |

FIG. 7

| | FACTOR | CHECK SITUATION | REGISTRANT |
|---|---|---|---|
| 1 | FACTOR 1 (WITH LINK TO DETAIL PAGE) | HOLD | AAA |
| 2 | FACTOR 2 (WITH LINK TO DETAIL PAGE) | NO ABNORMALITY | BBB |
| 3 | FACTOR 3 (WITH LINK TO DETAIL PAGE) | UNCHECKED | - |

FIG. 8

| | Check Point |
|---|---|
| 1 | DISPLAY CHECK ITEM HERE |
| 2 | DISPLAY CHECK ITEM HERE |
| 3 | DISPLAY CHECK ITEM HERE |

⦿ NO ABNORMALITY
○ ABNORMALITY
○ HOLD

COMMENT FIELD

[DISPLAY REGISTRANT] [REGISTER] [PREVIOUS] [NEXT]

FIG. 10

| Home > Past Events | | | | |
|---|---|---|---|---|
| | Event List | Pending | Completed | View Mail |
| GROUP { Feb-27-2018 12:39 TO | oooo | ✓ | | View Mail |
| Feb-27-2018 12:39 | | | | |
| Feb-27-2018 12:41 | oooo | | | View Mail |
| GROUP { Feb-25-2018 06:39 TO | | | | |
| Feb-25-2018 06:39 | oooo | | ✓ | View Mail |
| Feb-25-2018 06:41 | oooo | | | View Mail |
| GROUP { Feb-24-2018 09:39 TO | | | | |
| Feb-24-2018 09:39 | oooo | ✓ | | View Mail |
| Feb-24-2018 09:41 | oooo | | | View Mail |
| GROUP { Feb-18-2018 08:39 TO | | | | |
| Feb-18-2018 08:39 | oooo | | | View Mail |
| Feb-18-2018 08:41 | oooo | | | View Mail |
| GROUP { Feb-17-2018 09:39 TO | | | | |
| Feb-17-2018 09:39 | oooo | | | View Mail |
| Feb-17-2018 09:41 | oooo | | | View Mail |

NOTIFICATION DEVICE, NOTIFICATION METHOD, AND PROGRAM

TECHNICAL FIELD

The present invention relates to a notification device, a notification method, and a program.

The present application claims priority with respect to Japanese Patent Application No. 2018-148623 filed in Japan on Aug. 7, 2018, the contents of which are incorporated herein by reference.

BACKGROUND ART

Once a major failure occurs in a plant equipped with a gas turbine or the like, it often takes time and money to recover. Therefore, detection of a sign of an abnormality is often performed on a regular basis.

PTL 1 describes, as a related technique, a technique of monitoring an operation of a plant, estimating a cause of abnormality, and sending notification of the cause externally.

CITATION LIST

Patent Literature

[PTL 1] Japanese Unexamined Patent Application Publication No. 11-110036

SUMMARY OF INVENTION

Technical Problem

In the plant equipped with the gas turbine or the like, there is an inspection item for which presence or absence of the abnormality can be relatively easily checked while operating the plant and an inspection item for which the presence or absence of the abnormality cannot be checked unless the plant is stopped, even in a case where the abnormality or a state of the plant that is considered to be the sign of the abnormality is detected. Thus, the detection of the abnormality or the state considered to be the sign of the abnormality does not mean that all inspection items can be checked immediately. Therefore, when the work of checking only a part of the inspection items is repeated in a case where the abnormality or the state considered to be the sign of the abnormality is detected, an unchecked inspection item may be buried in various pieces of information, and thus an inspection item to be checked may be unknown.

An object of the present invention is to provide a notification device, a notification method, and a program capable of solving the above problems.

Solution to Problem

According to a first aspect of the present invention, a notification device includes an abnormality estimation unit for estimating a state relating to an abnormality of a plant and a factor relating to the abnormality of the plant, an item specifying unit for specifying an inspection item on the basis of the state relating to the abnormality of the plant and of the factor relating to the abnormality of the plant estimated by the abnormality estimation unit, a notification unit for notifying of the inspection item specified by the item specifying unit, a stop-time item specifying unit for specifying the inspection item to be checked at a time of stop out of the inspection items specified by the item specifying unit, a check result acquisition unit for receiving a check result for the inspection item of which the notification unit sends notification, and a stop-time item output unit for outputting the inspection item to be checked at the time of stop.

According to a second aspect of the present invention, in the notification device according to the first aspect, the stop-time item specifying unit may specify the inspection item to be checked at the time of stop on the basis of the check result.

According to a third aspect of the present invention, the notification device according to the first aspect may further include a storage unit for storing the inspection item to be checked at the time of stop in advance. The stop-time item specifying unit may specify the inspection item to be checked at the time of stop on the basis of the inspection item to be checked at the time of stop, which is stored in the storage unit in advance.

According to a fourth aspect of the present invention, the notification device according to the first aspect may further include a learning unit for correcting an occurrence probability of the factor relating to the abnormality of the plant on the basis of the check result.

According to a fifth aspect of the present invention, in the notification device according to the fourth aspect, the abnormality estimation unit may estimate the state relating to the abnormality of the plant on the basis of a sensor value detected by a sensor provided in the plant, and specify the factor relating to the abnormality of the plant on the basis of the state relating to the abnormality of the plant and of the occurrence probability corrected by the learning unit.

According to a sixth aspect of the present invention, in the notification device according to the fifth aspect, the sensor value may include a past sensor value detected by the sensor.

According to a seventh aspect of the present invention, the notification device according to any one of the first to sixth aspects may further include an information update unit for updating website information related to the inspection item specified by the item specifying unit out of website information displayed on a website.

According to an eighth aspect of the present invention, the notification device according to any one of the first to seventh aspects may further include a check order specifying unit for specifying a check order in which the inspection item is checked on the basis of log information related to the check result, and a priority determination unit for determining priority of displaying the inspection item on the basis of the check order.

According to a ninth aspect of the present invention, a notification method includes estimating a state relating to an abnormality of a plant and a factor relating to the abnormality of the plant, specifying an inspection item on the basis of the state relating to the abnormality of the plant and of the estimated factor relating to the abnormality of the plant, notifying of the specified inspection item, specifying the inspection item to be checked at a time of stop out of the specified inspection items, receiving a check result for the inspection item of which notification has been sent, and outputting the inspection item to be checked at the time of stop.

According to a tenth aspect of the present invention, the notification method according to the ninth aspect may further include specifying the inspection item to be checked at the time of stop on the basis of the check result.

According to an eleventh aspect of the present invention, the notification method according to the ninth aspect may further include storing the inspection item to be checked at the time of stop in advance, and specifying the inspection item to be checked at the time of stop on the basis of the inspection item to be checked at the time of stop, which is stored in advance.

According to a twelfth aspect of the present invention, the notification method according to the ninth aspect may further include correcting an occurrence probability of the factor relating to the abnormality of the plant on the basis of the check result.

According to a thirteenth aspect of the present invention, the notification method according to any one of the ninth to twelfth aspects may further include specifying a check order in which the inspection item is checked on the basis of log information related to the check result, and determining priority of displaying the inspection item on the basis of the check order.

According to a fourteenth aspect of the present invention, a program causing a computer to execute estimating a state relating to an abnormality of a plant and a factor relating to the abnormality of the plant, specifying an inspection item on the basis of the state relating to the abnormality of the plant and of the estimated factor relating to the abnormality of the plant, notifying of the specified inspection item, specifying the inspection item to be checked at a time of stop out of the specified inspection items, receiving a check result for the inspection item of which notification has been sent, and outputting the inspection item to be checked at the time of stop.

Advantageous Effects of Invention

With the notification device, the notification method, and the program according to the embodiment of the present invention, it is possible for a person in charge of inspection to recognize the inspection item to be inspected.

BRIEF DESCRIPTION OF DRAWINGS

FIG. 4 is a diagram showing a first data table according to the first embodiment of the present invention.

FIG. 5 is a diagram showing a mail display screen according to the first embodiment of the present invention.

FIG. 7 is a first diagram showing a display screen on a website according to the first embodiment of the present invention.

FIG. 8 is a second diagram showing a display screen on the website according to the first embodiment of the present invention.

FIG. 10 is a third diagram showing a display screen on the website according to the first embodiment of the present invention.

DESCRIPTION OF EMBODIMENTS

First Embodiment

Hereinafter, embodiments will be described in detail with reference to drawings.

A configuration of a plant management system 1 according to a first embodiment of the present invention will be described.

The plant management system 1 is a system that specifies and outputs an inspection item to be checked when a plant is stopped such that there is no omission in the inspection item when the plant is stopped. The plant is, for example, a plant that generates electricity using a gas turbine.

The plant management system 1 is a system that determines whether or not the plant is in a state relating to an abnormality of the plant (for example, an abnormality state of the plant, a state indicating a sign of the abnormality of the plant, or the like) on the basis of a state quantity detected by a sensor provided in the plant. In a case where the plant is determined to be in the state relating to the abnormality of the plant, for each factor that causes the plant to be in the state relating to the abnormality of the plant, the plant management system 1 is a system that corrects an occurrence probability that the plant is in the state relating to the abnormality of the plant due to each factor on the basis of a check result actually checked by a plant manager. The plant management system 1 is a system that changes a display of the inspection item notified to the plant manager according to a check situation of the inspection item.

Figure 1:
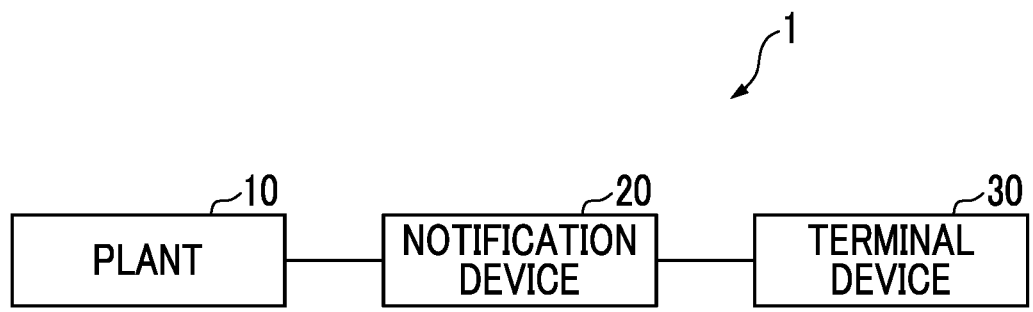
FIG. 1 is a diagram showing a configuration of a plant management system according to a first embodiment of the present invention.

As shown in FIG. 1, the plant management system 1 includes a plant 10, a notification device 20, and a terminal device 30.

Figure 2:
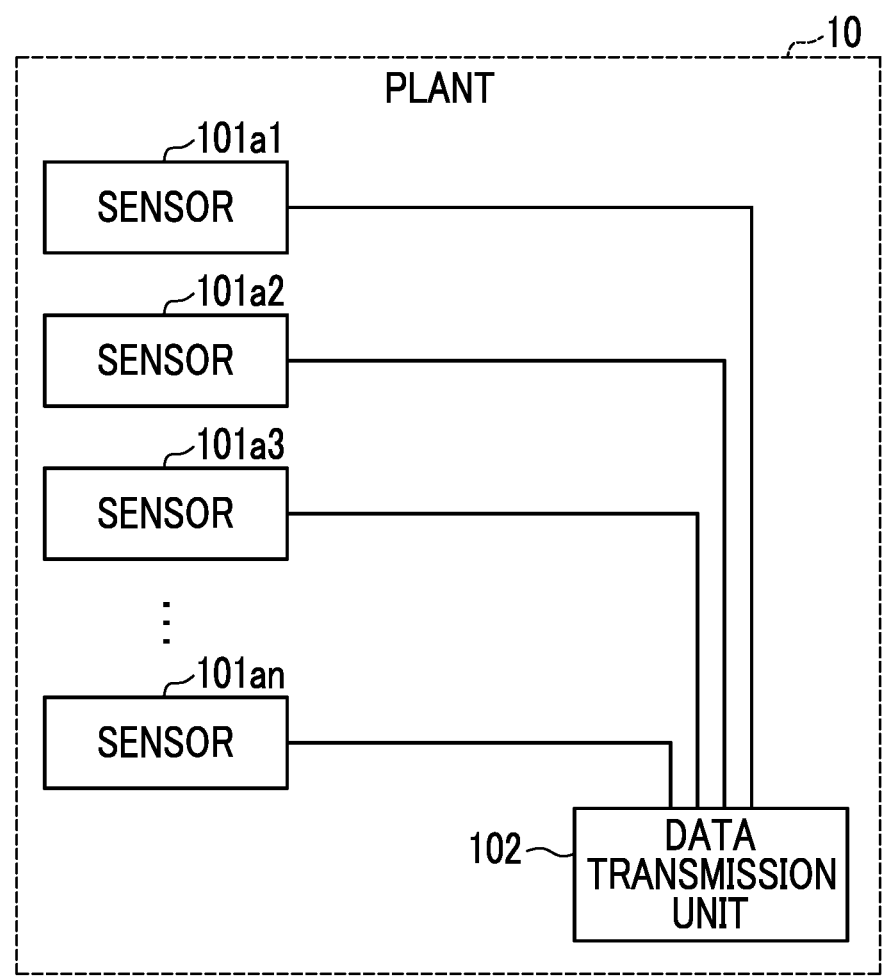
FIG. 2 is a diagram showing a configuration of a plant according to the first embodiment of the present invention.

The plant 10 is, for example, a power generation facility owned by the plant manager. As shown in FIG. 2, the plant 10 includes sensors 101a1, 101a2, 101a3, ..., and 101an, and a data transmission unit 102. The sensors 101a1, 101a2, 101a3, ..., and 101an are collectively referred to as a sensor 101.

The sensor 101 detects the state quantity in the plant 10. The state quantity is a physical quantity used when the abnormality in the plant 10 is estimated and is, for example, temperature, pressure, or the like. Hereinafter, the state quantity detected by the sensor 101 is referred to as a "sensor value". Each of the sensors 101 outputs the detected sensor value to the data transmission unit 102.

The data transmission unit 102 receives the sensor value from each of the sensors 101. The data transmission unit 102 transmits the received sensor value to the notification device 20.

Figure 3:
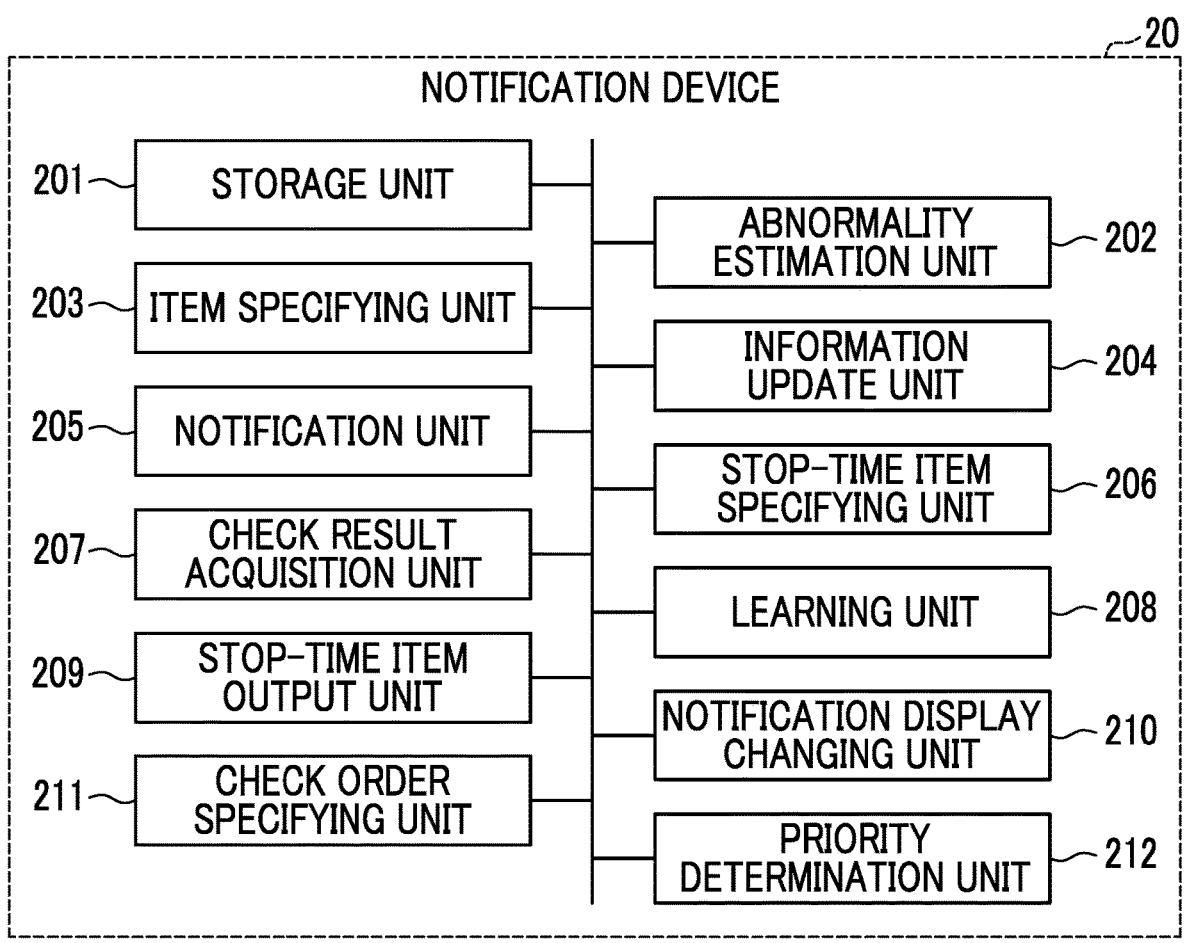
FIG. 3 is a diagram showing a configuration of a notification device according to the first embodiment of the present invention.

As shown in FIG. 3, the notification device 20 includes a storage unit 201, an abnormality estimation unit 202, an item specifying unit 203, an information update unit 204, a notification unit 205, a stop-time item specifying unit 206, a check result acquisition unit 207, a learning unit 208, a stop-time item output unit 209, a notification display changing unit 210, a check order specifying unit 211, and a priority determination unit 212. The notification device 20 is, for example, a device owned by a contractor who provides the plant 10 to the plant manager and performs a periodic inspection of the plant 10.

The storage unit 201 stores various pieces of information necessary for processing performed by the notification device 20. For example, the storage unit 201 stores a past sensor value of the plant 10 obtained in a state where the plant 10 is operated normally as a unit space of the Mahalanobis distance. The storage unit 201 stores a first data table TBL1 shown in FIG. 4. The first data table TBL1 is a data table in which the factor and the inspection item are associated with each other. The storage unit 201 stores each factor that causes the plant 10 to be in the state relating to the abnormality of the plant 10 and the occurrence probability of the factor in association with each other for each state relating to the abnormality of the plant 10.

The abnormality estimation unit 202 estimates the state relating to the abnormality of the plant 10. For example, the abnormality estimation unit 202 receives the sensor value of each sensor 101 from the data transmission unit 102. The abnormality estimation unit 202 acquires a command value for the plant 10. The abnormality estimation unit 202 calculates the Mahalanobis distance using a Mahalanobis Taguchi method on the basis of the received sensor value and of the command value for the plant 10. The abnormality estimation unit 202 determines that the plant 10 is in the state relating to the abnormality of the plant 10 in a case where the Mahalanobis distance is equal to or larger than a predetermined threshold value (for example, 3.5). A value of 3 or more is usually set for the threshold value.

In a case where the plant 10 is determined to be in the state relating to the abnormality of the plant 10, the abnormality estimation unit 202 calculates an SN ratio (signal-to-noise ratio) according to the Mahalanobis Taguchi method on the basis of the received sensor value and of the command value for the plant 10. That is, the abnormality estimation unit 202 obtains a larger-the-better SN ratio of presence or absence of the item via an orthogonal array analysis. It can be determined that there is a higher probability that items of the sensor value and the command value are abnormal as the SN ratio becomes larger. The abnormality estimation unit 202 calculates the likelihood of each factor that causes the plant 10 to be in the state relating to the abnormality of the plant 10 on the basis of the calculated SN ratio. In a case where the plant 10 is the plant that generates electricity using the gas turbine, examples of the factor include a decrease in gas turbine efficiency, a decrease in compressor efficiency, a decrease in turbine efficiency, a decrease in an air amount at a compressor inlet, an increase in exhaust temperature, a decrease in a compressor compression ratio, a decrease in fuel efficiency, an increase in gas temperature at a turbine inlet, and an increase in exhaust gas pressure. For example, the abnormality estimation unit 202 calculates a weighted sum of the occurrence probability and the SN ratio stored in the storage unit 201 of the factor for each factor, for each state relating to the abnormality of the plant 10, to calculate the likelihood of each factor.

The item specifying unit 203 specifies the inspection item on the basis of the state relating to the abnormality of the plant 10 estimated by the abnormality estimation unit 202. For example, the item specifying unit 203 receives the factor from the abnormality estimation unit 202. The item specifying unit 203 specifies the inspection item associated with the received factor in the first data table TBL1 stored in the storage unit 201. The item specifying unit 203 outputs inspection item information indicating the specified inspection item to the information update unit 204 and the notification unit 205.

The information update unit 204 updates website information to be displayed on a website. For example, the information update unit 204 receives the inspection item information from the item specifying unit 203. The information update unit 204 updates the website information to be displayed on the website for all the inspection items of the inspection items indicated by the received inspection item information.

The notification unit 205 sends notification of the inspection item specified by the item specifying unit 203. For example, the notification unit 205 sends notification of at least an inspection item whose inspection time does not have to be when the plant 10 is stopped (for example, a time of periodic inspection), out of the inspection items specified by the item specifying unit 203. Specifically, the notification unit 205 receives the inspection item information from the item specifying unit 203. The notification unit 205 transmits all the inspection items out of the inspection items indicated by the received inspection item information to the terminal device 30 by e-mail. As shown in FIG. 5, the e-mail includes, for example, information such as a date and time of transmission, estimated information on the inspection item, and an address of a linked website. The notification unit 205 transmits the e-mail to the terminal device 30 in this manner to notify the plant manager of the inspection item. The plant manager accesses the website and thus can know a current check situation in detail for each inspection item. In a case where an inspection item of which notification is to be sent is not included in an inspection item of which notification has been most recently sent, or in a case where the state relating to the abnormality of the plant 10 is improved to a normal state even once since the latest notification (that is, a case where the Mahalanobis distance for the entire plant 10 calculated by the abnormality estimation unit 202 to determine the state relating to the abnormality for the entire plant 10 is within a range of a value indicating the normal state) even though the inspection item of which notification is to be sent includes the inspection item of which notification has been most recently sent, a mail transmitted by the notification unit 205 to the terminal device 30 for the inspection items is a new mail with a flag indicating a new mail. In a case where the inspection item of which notification is to be sent includes the inspection item of which notification has been most recently sent and the state relating to the abnormality of the plant 10 continues since the latest notification, a mail transmitted by the notification unit 205 to the terminal device 30 for the inspection items is a reminder mail with a flag indicating a reminder mail. The flag indicating the reminder mail includes the same flag as the transmitted mail including an inspection item for which the Mahalanobis distance has never been less than the predetermined threshold value from a time when the mail is transmitted to the present.

Figure 6:
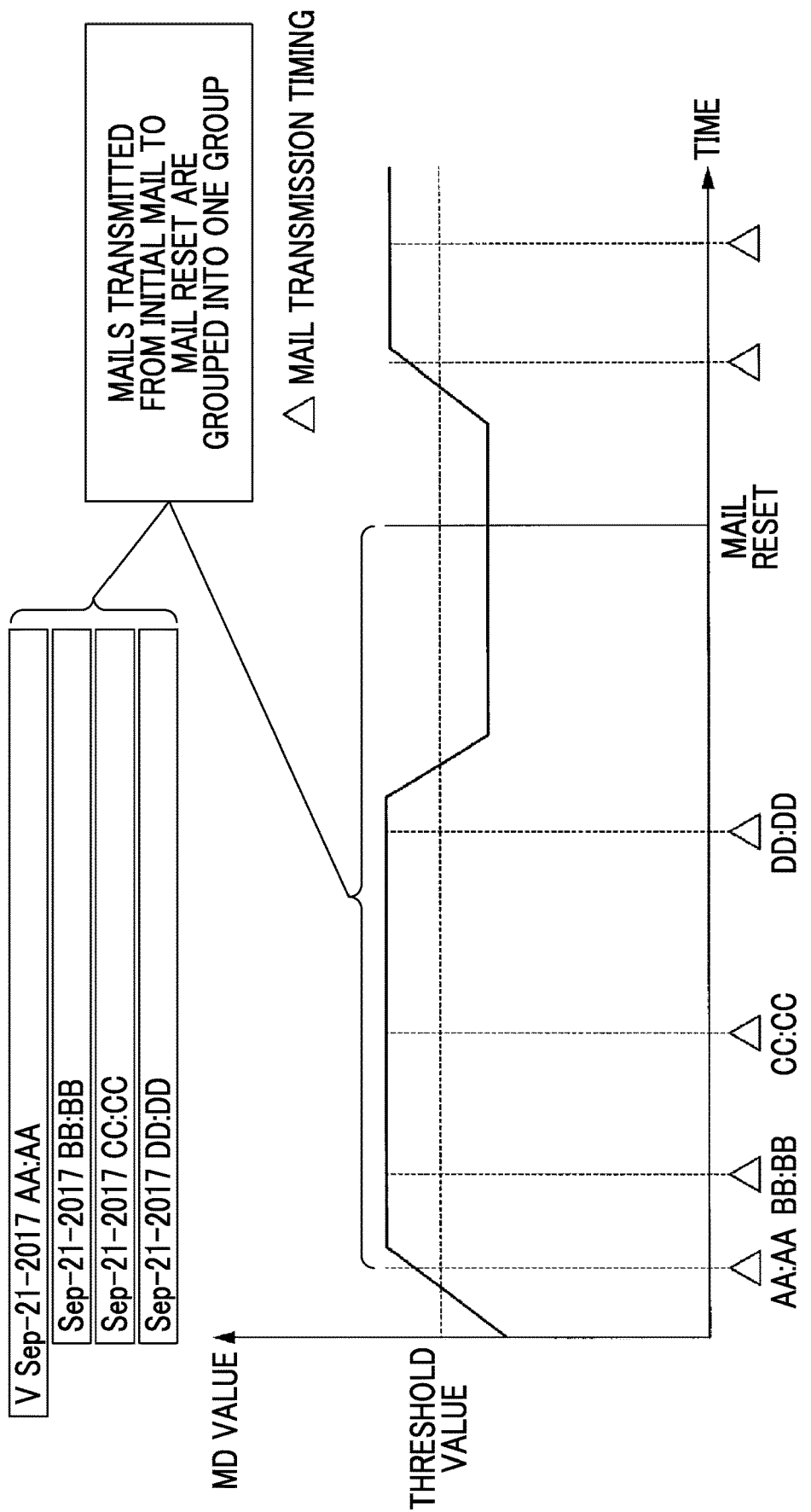
FIG. 6 is a diagram showing a mail transmission timing according to the first embodiment of the present invention.

As shown in FIG. 6, for example, in a case of emails transmitted at time AA:AA, BB:BB, CC:CC, and DD:DD, the Mahalanobis distance values exceed the threshold value at all the times and the Mahalanobis distance values are never equal to or less than the threshold value during the times (that is, the state relating to the abnormality of the plant 10 is not improved to the normal state even once).

The stop-time item specifying unit 206 specifies the inspection item to be checked when the plant 10 is stopped out of the inspection items specified by the item specifying unit 203. For example, the stop-time item specifying unit 206 specifies the inspection item for which the plant manager accesses the linked website described in the e-mail and inputs "hold" as the inspection item to be checked when the plant 10 is stopped.

The check result acquisition unit 207 acquires the check result of the inspection item of which the notification unit 205 sends notification to the terminal device 30. For example, the plant manager accesses the linked website described in the e-mail by using the terminal device 30 and checks each factor shown in FIG. 7 (factors 1 to 3 in FIG. 7) that may cause the plant 10 to be in the state relating to the abnormality of the plant 10. The plant manager actually checks the presence or absence of the abnormality (including the sign of the abnormality) in the plant 10. The plant manager performs an operation of tapping the link destination of each factor shown in FIG. 7 (described as "with link to detail page" in FIG. 7) in the terminal device 30. An input unit 304 outputs a command corresponding to the operation of tapping to a display control unit 303. The display control unit 303 causes a display unit 302 to display a linked screen shown in FIG. 8 on the basis of the command from the input unit 304. The plant manager performs an operation of selecting any one of "no abnormality", "abnormality", and "hold" on an input screen of the check result shown in FIG. 8. For example, the plant manager performs the operation of selecting "no abnormality" in a case where there is no abnormality in the plant 10. The plant manager performs the operation of selecting "abnormality" in a case where there is an abnormality in the plant 10. The plant manager performs the operation of selecting "hold" in a case where the presence or absence of the abnormality in the inspection item cannot be checked unless the plant 10 is stopped. When the check results are selected, the plant manager can input a registrant name, write a comment in a comment field as necessary, and tap a registration button to register the check result through the terminal device 30. At this time, the terminal device 30 transmits the check results of "abnormality", "no abnormality", and "hold" to the check result acquisition unit 207. The check result acquisition unit 207 acquires the check results of "abnormality", "no abnormality", and "hold" from the terminal device 30.

The check result acquisition unit 207 outputs the acquired check results of "abnormality" and "no abnormality" to the learning unit 208. The check result acquisition unit 207 outputs the acquired check results of "abnormality", "no abnormality", and "hold" to the notification display changing unit 210.

The learning unit 208 receives the check results of "abnormality" and "no abnormality" from the check result acquisition unit 207. The learning unit 208 corrects the occurrence probability on the basis of the check results of "abnormality" and "no abnormality" received from the check result acquisition unit 207. The check results of "no abnormality" and "abnormality" indicate a probability that the plant 10 is actually in the state relating to the abnormality of the plant 10. Therefore, the learning unit 208 can correct the occurrence probability on the basis of the check result and can more accurately specify an actual factor in the case where the plant 10 is in the state relating to the abnormality of the plant 10. That is, it is possible to increase an estimation probability of the state relating to the abnormality of the plant 10. In the learning performed by the learning unit 208, the occurrence probability determined by repeated trials using a neural network or the like may be applied to the correction of the occurrence probability.

The stop-time item output unit 209 outputs the inspection item to be checked when the plant 10 is stopped. For example, the stop-time item output unit 209 displays the inspection item on a display (not shown) at the time of periodic inspection of the plant 10. With the display of the inspection item on the display by the stop-time item output unit 209, it is possible to notify the person in charge of inspection of the inspection item and prevent omission of the inspection item.

The notification display changing unit 210 receives the check results of "abnormality", "no abnormality", and "hold" from the check result acquisition unit 207. The notification display changing unit 210 changes the display of the inspection item of which notification has been sent from the notification unit 205 displayed on the terminal device 30 according to the received check results of "abnormality", "no abnormality", and "hold". For example, the notification display changing unit 210 transmits color data to highlight the notification relating to the inspection item in green to the terminal device 30 in a case where the check result of the inspection item is "hold". The notification display changing unit 210 transmits color data to highlight the notification relating to the inspection item in red to the terminal device 30 in a case where the check result of the inspection item is "abnormality". The notification display changing unit 210 transmits color data to highlight the notification relating to the inspection item in blue to the terminal device 30 in a case where the check result of the inspection item is "no abnormality".

The check order specifying unit 211 specifies a check order in which the inspection item is checked on the basis of log information related to the check result. With the check order specifying unit 211, it is possible to know how the plant manager checks the inspection item.

The priority determination unit 212 determines priority to be displayed of the inspection item on the basis of the check order by the check order specifying unit 211. With the priority determination unit 212, for example, it is possible to know an inspection item that the plant manager places importance on and to display the inspection item with priority.

Figure 9:
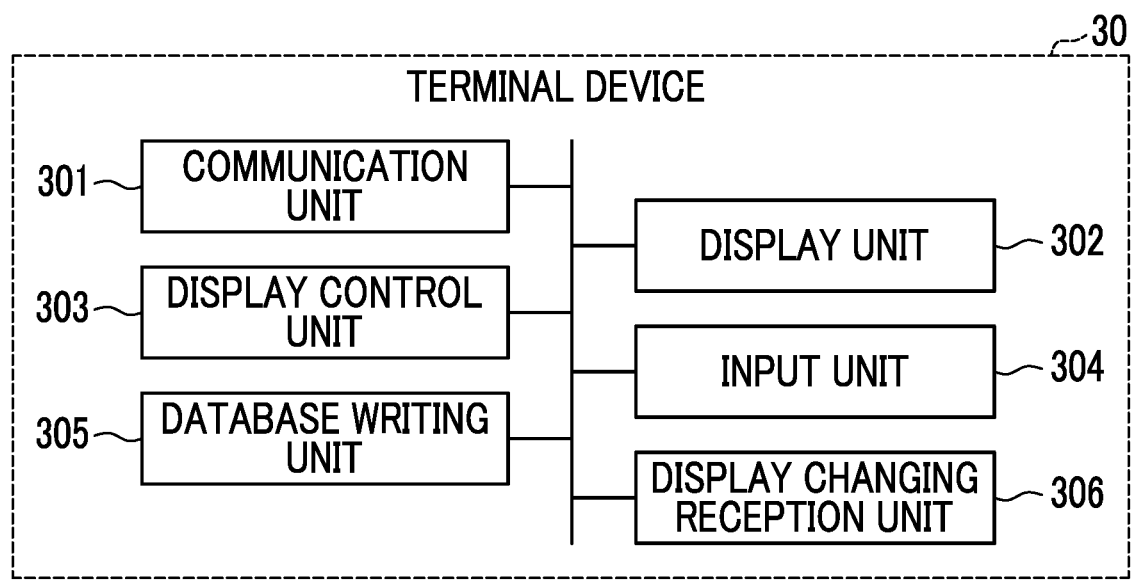
FIG. 9 is a diagram showing a configuration of a terminal device according to the first embodiment of the present invention.

As shown in FIG. 9, the terminal device 30 includes a communication unit 301, a display unit 302, a display control unit 303, an input unit 304, a database writing unit 305, and a display changing reception unit 306.

The communication unit 301 communicates with the notification device 20. For example, the communication unit 301 receives, from the notification device 20, a notification including at least an inspection item whose inspection time does not have to be when the plant 10 is stopped, out of the inspection items.

The display unit 302 displays the notification received from the notification device 20. The display of the notification displayed by the display unit 302 is, for example, the mail shown in FIG. 5. The display unit 302 displays the website. For example, the display unit 302 is the websites shown in FIGS. 7 and 8.

The display control unit 303 controls the display of the display unit 302. For example, the display control unit 303 causes the display unit 302 to display the notification received from the notification device 20. In a case where the communication unit 301 receives the notification of the inspection item from the notification device 20 as the reminder mail, for the reminder mail for the item that is not improved to the normal state even once since notification of the inspection item is sent, the display control unit 303 groups the mails into one group for each item and causes the display unit 302 to display the grouped mail as shown in FIG. 10, for example. In a case where the notification is the mail, the display control unit 303 causes the display unit 302 to display the mail using, for example, a mailer (mail software).

The display control unit 303 causes the display unit 302 to display the website. The display control unit 303 changes a color of the inspection item to a color corresponding to the received color data in a case where the color data to change the display of the inspection item is received from the notification display changing unit 210. For example, in a case where the check result of the inspection item is "hold" and the notification display changing unit 210 transmits the color data to highlight the notification relating to the inspection item in green to the terminal device 30, the display control unit 303 highlights the inspection item whose check result is "hold" in green on the display unit 302. In a case where the check result of the inspection item is "abnormality" and the notification display changing unit 210 transmits the color data to highlight the notification relating to the inspection item in red to the terminal device 30, the display control unit 303 highlights the inspection item whose check result is "abnormality" in red on the display unit 302. In a case where the check result of the inspection item is "no abnormality" and the notification display changing unit 210 transmits the color data to highlight the notification relating to the inspection item in blue to the terminal device 30, the display control unit 303 highlights the inspection item whose check result is "no abnormality" in blue on the display unit 302.

The input unit 304 receives the operation on the input unit 304 from the plant manager. The input unit 304 outputs the command corresponding to the received operation. For example, the input unit 304 is a touch sensor. The plant manager taps any one of the check results of "abnormality", "no abnormality", and "hold" displayed on the display unit 302 to cause the input unit 304 to output the command indicating that the check result tapped by the plant manager is selected to the display control unit 303.

The database writing unit 305 writes a current factor and the occurrence probability of the factor in association with each other in a database in which the data of the past factor and the occurrence probability of the factor are accumulated. The database writing unit 305 notifies the check result acquisition unit 207 that the current factor and the occurrence probability of the factor are associated with each other and are written in the database.

The display changing reception unit 306 specifies the inspection item and the color to display the inspection item on the basis of a combination of the color command and the inspection item. The display changing reception unit 306 outputs a display command to display the specified inspection item in a specified color to the display control unit 303. The display control unit 303 causes the display unit 302 to display the inspection item in a predetermined color on the basis of the display command.

Figure 11A:
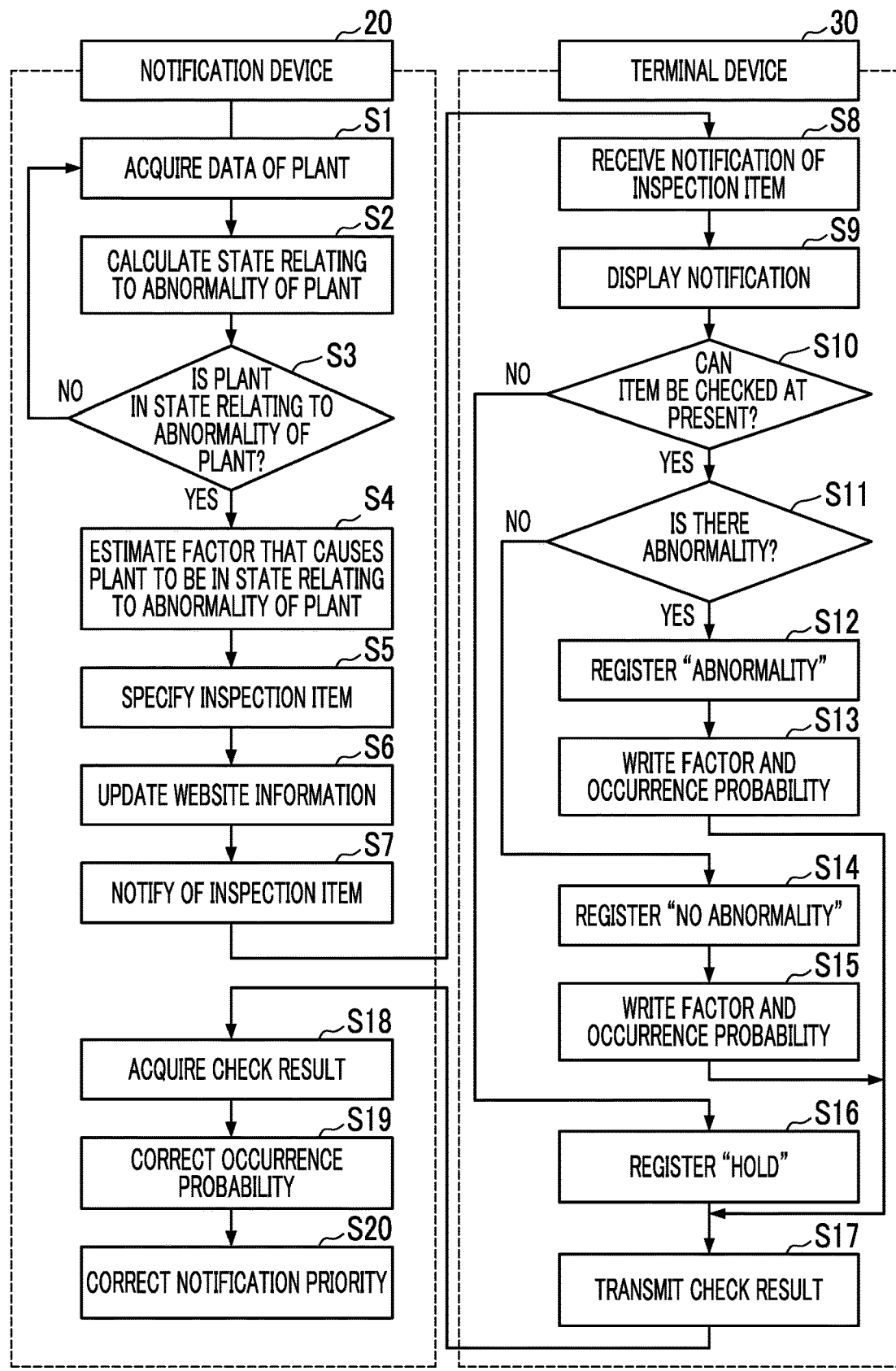
FIG. 11A is a first diagram showing a processing flow of the plant management system according to the first embodiment of the present invention.

Next, processing of the plant management system 1 according to the first embodiment of the present invention will be described with reference to FIGS. 11A and 11B.

Each sensor 101 detects the state quantity of the plant 10. The data transmission unit 102 transmits the state quantity of the plant 10 detected by each sensor 101 to the notification device 20.

The abnormality estimation unit 202 acquires the data of the plant 10 (step S1). Specifically, the abnormality estimation unit 202 receives the sensor value of each sensor 101 from the data transmission unit 102. The abnormality estimation unit 202 acquires the command value for the plant 10.

The abnormality estimation unit 202 calculates the state relating to the abnormality of the plant 10 (step S2). Specifically, the abnormality estimation unit 202 calculates the Mahalanobis distance by using the Mahalanobis Taguchi method on the basis of the received sensor value and of the command value for the plant 10.

The abnormality estimation unit 202 determines whether or not the plant 10 is in the state relating to the abnormality of the plant 10 (step S3). Specifically, the abnormality estimation unit 202 compares the Mahalanobis distance with the predetermined threshold value. The abnormality estimation unit 202 determines that the plant 10 is in the state relating to the abnormality of the plant 10 in a case where the Mahalanobis distance is determined to be equal to or larger than the predetermined threshold value. The abnormality estimation unit 202 determines that the plant 10 is not in the state relating to the abnormality of the plant 10 in a case where the Mahalanobis distance is determined to be less than the predetermined threshold value.

The abnormality estimation unit 202 returns the processing to the processing of step S1 in a case where the plant 10 is determined to not be in the state relating to the abnormality of the plant 10 (NO in step S3).

The abnormality estimation unit 202 estimates the factor that causes the plant 10 to be in the state relating to the abnormality of the plant 10 (step S4) in a case where the plant 10 is determined to be in the state relating to the abnormality of the plant 10 (YES in step S3). For example, the abnormality estimation unit 202 calculates the SN ratio according to the Mahalanobis Taguchi method on the basis of the received sensor value and of the command value. The abnormality estimation unit 202 calculates the likelihood of each factor that causes the state relating to the abnormality of the plant 10 on the basis of the calculated SN ratio. Specifically, the abnormality estimation unit 202 calculates the weighted sum of the occurrence probability and the SN ratio stored in the storage unit 201 of the factor for each factor, for each state relating to the abnormality of the plant 10, to calculate the likelihood.

The abnormality estimation unit 202 specifies the factors in descending order of the likelihood. The abnormality estimation unit 202 outputs the specified factor to the item specifying unit 203.

The item specifying unit 203 specifies the inspection item (step S5). Specifically, the item specifying unit 203 receives the factor from the abnormality estimation unit 202. The item specifying unit 203 specifies the inspection item associated with the received factor in the first data table TBL1 stored in the storage unit 201. The item specifying unit 203 outputs the inspection item information indicating the specified inspection item to the information update unit 204 and the notification unit 205.

The information update unit 204 updates the website information to be displayed on the website (step S6). For example, the information update unit 204 receives the inspection item information from the item specifying unit 203. The information update unit 204 updates the website information to be displayed on the website for all the inspection items of the inspection items indicated by the received inspection item information.

The notification unit 205 sends notification of the inspection item specified by the item specifying unit 203 (step S7). For example, the notification unit 205 sends notification of at least the inspection item whose inspection time does not have to be when the plant 10 is stopped (for example, the time of periodic inspection), out of the inspection items specified by the item specifying unit 203. Specifically, the notification unit 205 receives the inspection item information from the item specifying unit 203. The notification unit 205 transmits all the inspection items of the inspection items indicated by the received inspection item information to the terminal device 30 by e-mail. The notification unit 205 transmits the e-mail to the terminal device 30 in this manner to notify the plant manager of the inspection item. The plant manager accesses the website through the terminal device 30 and thus can know the current check situation in detail for each inspection item.

The display control unit 303 receives the notification of the inspection item from the notification device 20 through the communication unit 301 (step S8). The display control unit 303 causes the display unit 302 to display the received notification of the inspection item (step S9). At this time, the display screen displayed by the display unit 302 is, for example, a mail screen shown in FIG. 6.

The plant manager performs the notification displayed on the display unit 302, for example, the operation of tapping the link destination on the mail screen shown in FIG. 6 to the input unit 304. The input unit 304 outputs the command to tap the link destination to the display control unit 303 in response to the tap operation by the plant manager. The display control unit 303 displays the screen on the linked website, for example, the screen shown in FIG. 8 in response to the command to tap the link destination. The plant manager performs the operation of tapping "with link to detail page" on the screen shown in FIG. 8. The input unit 304 outputs the command corresponding to the operation of tapping to the display control unit 303. The display control unit 303 causes the display unit 302 to display the linked screen shown in FIG. 9 on the basis of the command from the input unit 304. The plant manager determines whether or not the inspection item on the input screen of the check result shown in FIG. 9 (described as "check item" in FIG. 9) is an item that can be checked at present (step S10).

The plant manager determines whether or not there is the abnormality in the plant 10 (step S11) in a case where the inspection item is determined to be an item that can be checked at present (YES in step S10).

The plant manager performs the operation of selecting "abnormality" for the input unit 304 and the database writing unit 305 registers "abnormality" in the inspection item (step S12) in a case where determination is made that there is the abnormality in the plant 10 (YES in step S11). The database writing unit 305 writes the current factor and the occurrence probability of the factor in association with each other in the database in which the data of the past factor and the occurrence probability of the factor are accumulated (step S13).

The plant manager performs the operation of selecting "no abnormality" for the input unit 304, and the database writing unit 305 registers "no abnormality" in the inspection item (step S14) in a case where determination is made that there is no abnormality in the plant 10 (NO in step S11). The database writing unit 305 writes the current factor and the occurrence probability of the factor in association with each other in the database in which the data of the past factor and the occurrence probability of the factor are accumulated (step S15).

The plant manager performs the operation of selecting "hold" (pending) for the input unit 304, and the database writing unit 305 registers "hold" in the inspection item (step S16) in a case where determination is made that the inspection item is not an item that can be checked at present, that is, an item that cannot be inspected unless the plant 10 is stopped (NO in step S10).

Here, the database writing unit 305 transmits the check results of "abnormality", "no abnormality", and "hold" to the notification device 20 (step S17). The check result acquisition unit 207 acquires the check results of "abnormality", "no abnormality", and "hold" from the terminal device 30 (step S18).

The check result acquisition unit 207 outputs the acquired check results of "abnormality" and "no abnormality" to the learning unit 208. The check result acquisition unit 207 outputs the acquired check results of "abnormality", "no abnormality", and "hold" to the notification display changing unit 210.

The learning unit 208 receives the check results of "abnormality" and "no abnormality" from the check result acquisition unit 207. The learning unit 208 corrects the occurrence probability on the basis of the check results of "abnormality" and "no abnormality" received from the check result acquisition unit 207 (step S19). The check results of "no abnormality" and "abnormality" indicate the probability that the plant 10 is actually in the state relating to the abnormality of the plant 10. Therefore, the learning unit 208 can correct the occurrence probability on the basis of the check result and can more accurately specify an actual factor in the case where the plant 10 is in the state relating to the abnormality of the plant 10. That is, it is possible to increase the estimation probability of the state relating to the abnormality of the plant 10. In the learning performed by the learning unit 208, the occurrence probability determined by repeated trials using a neural network or the like may be applied to the correction of the occurrence probability.

The check order in which the plant manager checked the inspection item can be specified by the log information of the check result, and the priority of the inspection item can be determined on the basis of the specified check order (step S20). As a result, it is possible to display an item that is likely to have the abnormality in the front and display an item that the plant manager emphasizes with priority.

After the processing of steps S13, S15, or S16 is performed, the notification device 20 repeats the processing of steps S1 to S7 at a predetermined time interval and notifies the terminal device 30 of the inspection item.

At this time, in a case where an inspection item of which notification is to be sent is not included in an inspection item of which notification has been most recently sent, or in a case where the state relating to the abnormality of the plant 10 is improved to a normal state even once since the latest notification even though the inspection item of which notification is to be sent includes the inspection item of which notification has been most recently sent, the notification unit 205 transmits the inspection item to the terminal device 30 as a new mail with a flag indicating a new mail. In a case where the inspection item of which notification is to be sent includes the inspection item of which notification has been most recently sent and the state relating to the abnormality of the plant 10 continues since the latest notification, the notification unit 205 transmits the inspection item to the terminal device 30 as a reminder mail with a flag indicating a reminder mail.

Figure 11B:
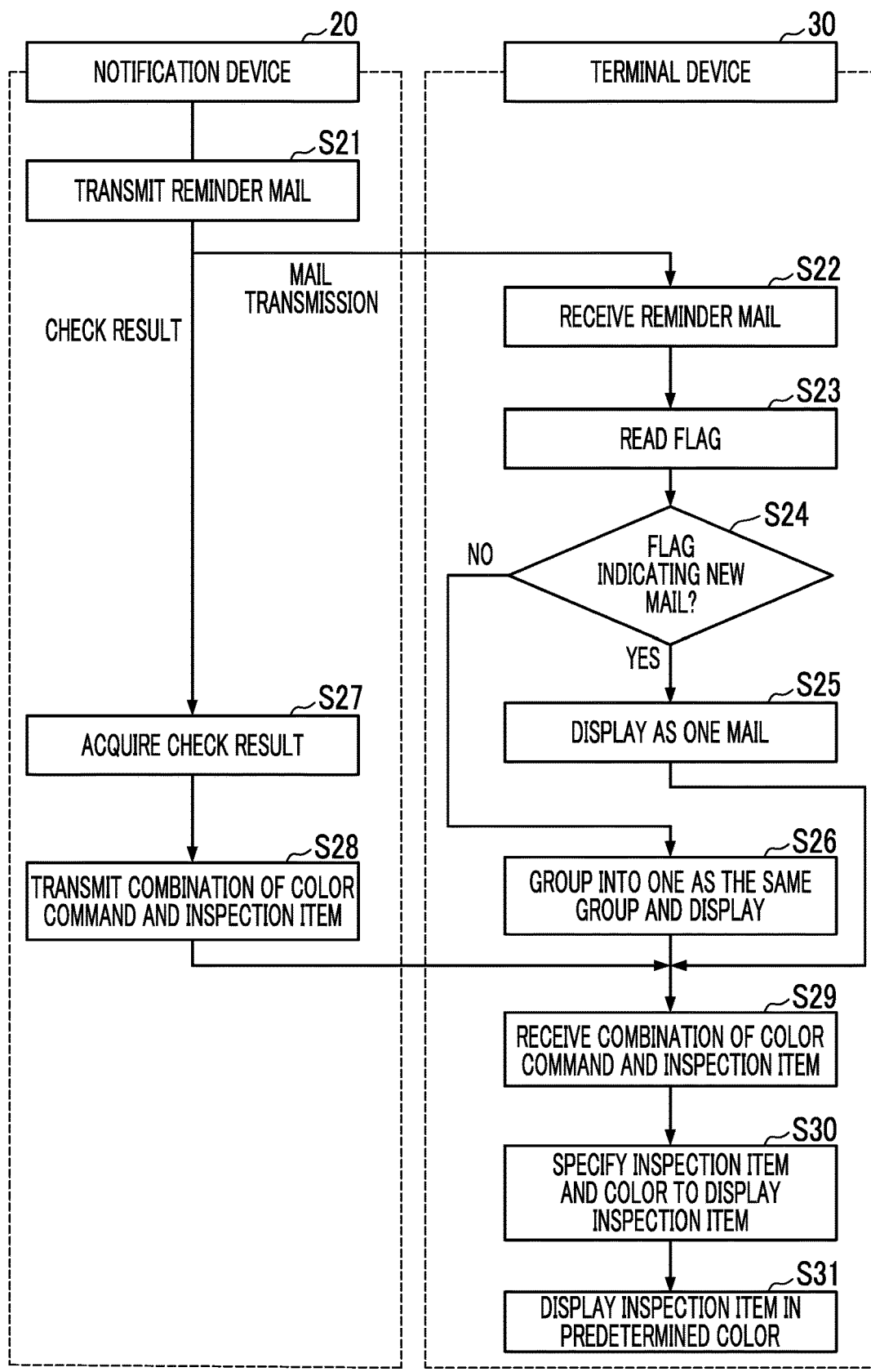
FIG. 11B is a second diagram showing a processing flow of the plant management system according to the first embodiment of the present invention.

Here, it is assumed that the notification unit 205 transmits the reminder mail with the flag indicating the reminder mail to the terminal device 30 in the processing of step S21 shown in FIG. 11B.

The display control unit 303 receives the reminder mail from the notification device 20 through the communication unit 301 (step S22). The display control unit 303 reads the flag in the received reminder mail (step S23). The display control unit 303 determines whether or not the read flag is a flag indicating the new mail (step S24).

The display control unit 303 independently displays the received mail on the display unit 302 as one mail (step S25) in a case where the read flag is determined to be the flag indicating the new mail (YES in step S24).

The display control unit 303 specifies a past mail having the same flag as the flag in a case where the read flag is determined to not be the flag indicating the new mail, that is, the flag indicating the reminder mail (NO in step S24). The display control unit 303 groups the past mails having the same flag into one group as the same group and causes the display unit 302 to display the grouped mail (step S26).

Next, processing in a case where the notification device 20 changes the display of the terminal device 30 will be described.

The notification display changing unit 210 acquires the check results of "abnormality", "no abnormality", and "hold" from the check result acquisition unit 207 (step S27). The notification display changing unit 210 transmits the combination of the color command to display the inspection item on the terminal device 30 in a color corresponding to the acquired check results of "abnormality", "no abnormality", and "hold" and the inspection item, to the terminal device 30 (step S28). For example, the notification display changing unit 210 transmits the combination of the color command to highlight the notification relating to the inspection item in green and the inspection item to the terminal device 30 in a case where the check result of the inspection item is "hold". The notification display changing unit 210 transmits the combination of the color command to highlight the notification relating to the inspection item in red and the inspection item to the terminal device 30 in a case where the check result of the inspection item is "abnormality". The notification display changing unit 210 transmits the combination of the color command to highlight the notification relating to the inspection item in blue and the inspection item to the terminal device 30 in a case where the check result of the inspection item is "no abnormality".

The display changing reception unit 306 receives the combination of the color command and the inspection item from the notification device 20 (step S29). The display changing reception unit 306 specifies the inspection item and the color to display the inspection item on the basis of the combination of the received color command and the inspection item (step S30). The display changing reception unit 306 outputs the display command to display the specified inspection item in the specified color to the display control unit 303. The display control unit 303 causes the display unit 302 to display the inspection item in a predetermined color on the basis of the display command (step S31).

Here, processing of the plant management system 1 in a case where the plant 10 is stopped to perform the inspection will be described.

The processing of the plant management system 1 will be described assuming that the person in charge of inspection uses a terminal device 30a similar to the terminal device 30.

The stop-time item output unit 209 outputs the inspection item to be checked when the plant 10 is stopped (step S41). For example, the stop-time item output unit 209 causes, for example, the display unit 302 of the terminal device 30a to display the inspection item. Accordingly, the person in charge of inspection can know the inspection item, and it is possible to prevent the omission of the inspection item.

The person in charge of inspection determines whether or not there is the abnormality in the plant 10 (step S42). The person in charge of inspection performs the operation of selecting "abnormality" for the input unit 304, and the database writing unit 305 registers "abnormality" in the inspection item (step S43) in a case where determination is made that there is the abnormality in the plant 10 (YES in step S42). The database writing unit 305 writes the current factor and the occurrence probability of the factor in association with each other in the database in which the data of the past factor and the occurrence probability of the factor are accumulated (step S44).

The person in charge of inspection performs the operation of selecting "no abnormality" for the input unit 304, and the database writing unit 305 registers "no abnormality" in the inspection item (step S45) in a case where determination is made that there is no abnormality in the plant 10 (NO in step S42). The database writing unit 305 writes the current factor and the occurrence probability of the factor in association with each other in the database in which the data of the past factor and the occurrence probability of the factor are accumulated (step S46).

Here, the database writing unit 305 transmits the check results of "abnormality" and "no abnormality" to the notification device 20 (step S47). The check result acquisition unit 207 acquires the check results of "abnormality" and "no abnormality" from the terminal device 30 (step S48).

The check result acquisition unit 207 outputs the acquired check results of "abnormality" and "no abnormality" to the learning unit 208. The check result acquisition unit 207 outputs the acquired check results of "abnormality" and "no abnormality" to the notification display changing unit 210.

The learning unit 208 receives the check results of "abnormality" and "no abnormality" from the check result acquisition unit 207. The learning unit 208 corrects the occurrence probability on the basis of the check results of "abnormality" and "no abnormality" received from the check result acquisition unit 207 (step S49). The check results of "no abnormality" and "abnormality" indicate the probability that the plant 10 is actually in the state relating to the abnormality of the plant 10. Therefore, the learning unit 208 can correct the occurrence probability on the basis of the check result and can more accurately specify an actual factor in the case where the plant 10 is in the state relating to the abnormality of the plant 10. That is, it is possible to increase the estimation probability of the state relating to the abnormality of the plant 10. In the learning performed by the learning unit 208, the occurrence probability determined by repeated trials using a neural network or the like may be applied to the correction of the occurrence probability.

The check order in which the plant manager checked the inspection item can be specified by the log information of the check result, and the priority of the inspection item can be determined on the basis of the specified check order (step S50). As a result, it is possible to display an item that is likely to have the abnormality in the front and display an item that the plant manager emphasizes with priority.

The plant management system 1 according to the first embodiment of the present invention has been described above.

In the plant management system 1, the abnormality estimation unit 202 estimates the state relating to the abnormality of the plant 10. The item specifying unit 203 specifies the inspection item on the basis of the state relating to the abnormality of the plant 10 estimated by the abnormality estimation unit 202. The notification unit 205 sends notification of the inspection item specified by the item specifying unit 203. The inspection item to be checked at the time of stop out of the inspection items specified by the item specifying unit 203 is specified. The check result acquisition unit 207 receives the check result of the inspection item of which the notification unit 205 sends notification. The stop-time item output unit 209 outputs the inspection item to be checked at the time of stop.

Thus, the abnormality estimation unit 202 can estimate the abnormality of the plant 10, and the inspection item that cannot be inspected unless the plant 10 is stopped out of the inspection items specified by the item specifying unit 203 can be specified. When the plant 10 is stopped, the stop-time item output unit 209 outputs the inspection item that cannot be inspected unless the plant 10 is stopped.

Accordingly, the person in charge of inspection checks the inspection item output by the stop-time item output unit 209 when the plant 10 is stopped, and it is possible to reduce the omission of the inspection item.

The stop-time item specifying unit 206 specifies the inspection item to be checked when the plant 10 is stopped on the basis of the check result.

Thus, the plant manager can specify the inspection item to be checked when the plant 10 is stopped, and a degree of freedom of selection for the plant manager is improved.

The learning unit 208 that corrects the occurrence probability of the factor that causes the state relating to the abnormality of the plant 10 on the basis of the check result is provided.

Thus, it is possible to more accurately detect a possible abnormality for the factor.

The check order specifying unit 211 specifies the check order in which the inspection item is checked on the basis of the log information related to the check result. The priority determination unit 212 determines the priority to be displayed of the inspection item on the basis of the check order by the check order specifying unit 211.

With the check order specifying unit 211, it is possible to know how the plant manager checks the inspection item. With the priority determination unit 212, for example, it is possible to know an inspection item that the plant manager places importance on and to display the inspection item with priority.

Second Embodiment

Next, a configuration of the plant management system 1 according to a second embodiment of the present invention will be described.

Similar to the plant management system 1 according to the first embodiment of the present invention, the plant management system 1 according to the second embodiment of the present invention is a system that specifies and outputs the inspection item to be checked when the plant 10 is stopped such that there is no omission in the inspection item when the plant 10 is stopped. The plant 10 is, for example, a plant that generates electricity using a gas turbine.

The plant management system 1 is a system that determines whether or not the plant 10 is in a state relating to the abnormality of the plant 10 (for example, an abnormality state of the plant 10, a state indicating a sign of the abnormality of the plant 10, or the like) on the basis of a state quantity detected by a sensor 101 provided in the plant 10. In a case where the plant 10 is determined to be in the state relating to the abnormality of the plant 10, for each factor that causes the plant 10 to be in the state relating to the abnormality of the plant 10, the plant management system 1 is a system that corrects an occurrence probability that the plant 10 is in the state relating to the abnormality of the plant 10 due to each factor on the basis of a check result actually checked by a plant manager. The plant management system 1 is a system that changes a display of the inspection item notified to the plant manager according to a check situation of the inspection item.

In the first embodiment of the present invention, the plant manager selects the inspection item to be checked when the plant 10 is stopped as "hold". However, since the inspection item, to be checked when the plant 10 is stopped, is specified in advance in the second embodiment of the present invention, the inspection item that is difficult for the plant manager to check can be excluded in advance, and thus the plant manager can efficiently proceed with check work.

The storage unit 201 stores in advance the inspection item to be checked when the plant 10 is stopped.

The stop-time item specifying unit 206 specifies the inspection item to be checked at the time of stop on the basis of the inspection item to be checked at the time of stop of the plant 10 stored in advance in the storage unit 201.

Next, processing of the plant management system 1 according to the second embodiment of the present invention will be described with reference to FIGS. 12, 11B, and 11C.

Figure 12:
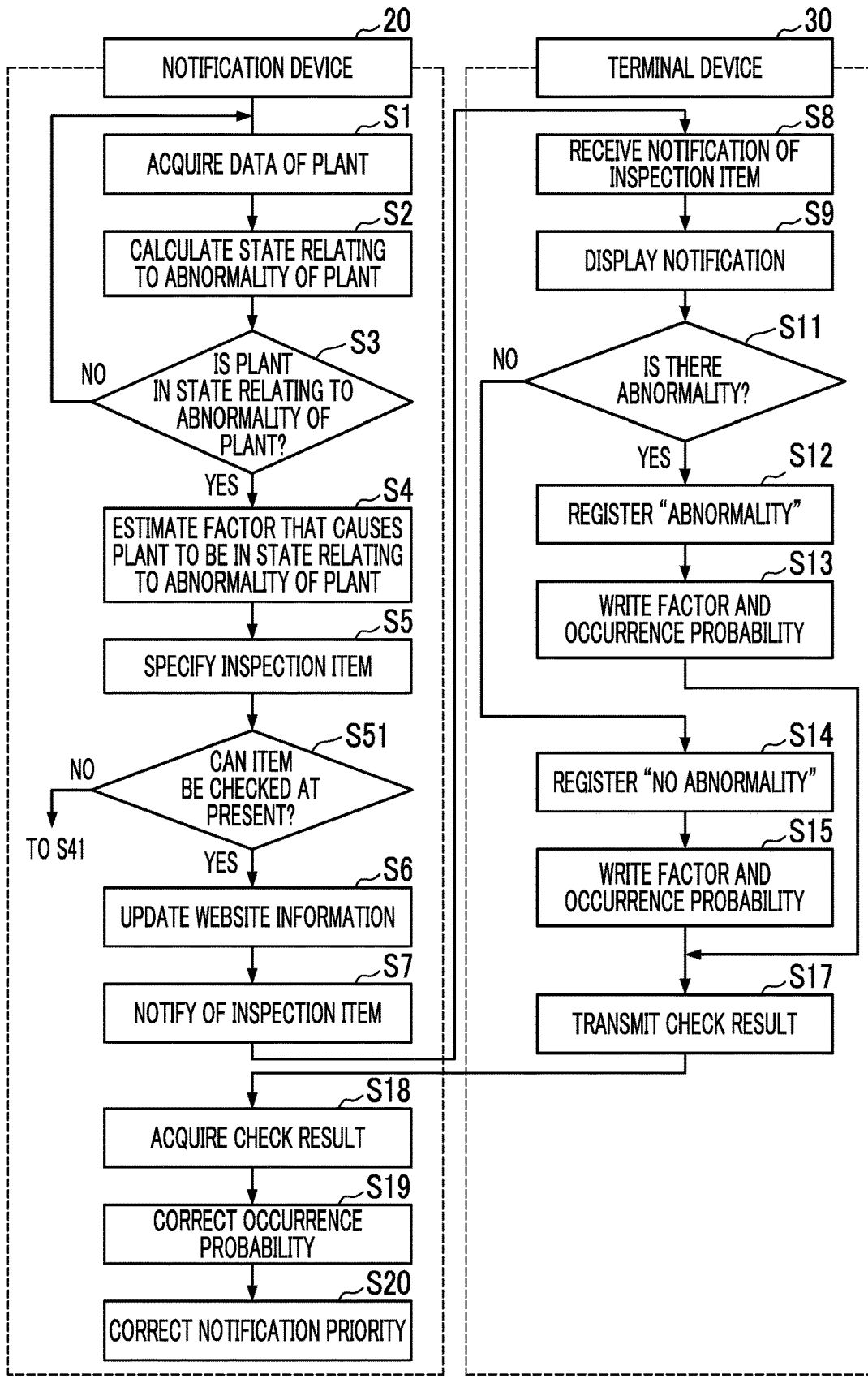
FIG. 12 is a diagram showing a processing flow of a plant management system according to a second embodiment of the present invention.

As shown in FIG. 12, each sensor 101 detects the state quantity of the plant 10. The data transmission unit 102 transmits the state quantity of the plant 10 detected by each sensor 101 to the notification device 20.

The processing of steps S1 to S5 is performed.

The item specifying unit 203 determines whether or not there is an item that can be checked at present (step S51).

The item specifying unit 203 proceeds to the processing of step S6 in a case where determination is made that there is the item that can be checked at present (YES in step S51). The processing proceeds to processing of step S31 shown in FIG. 11B, excluding the processing relating to steps S10, S16, and "hold".

Figure 11C:
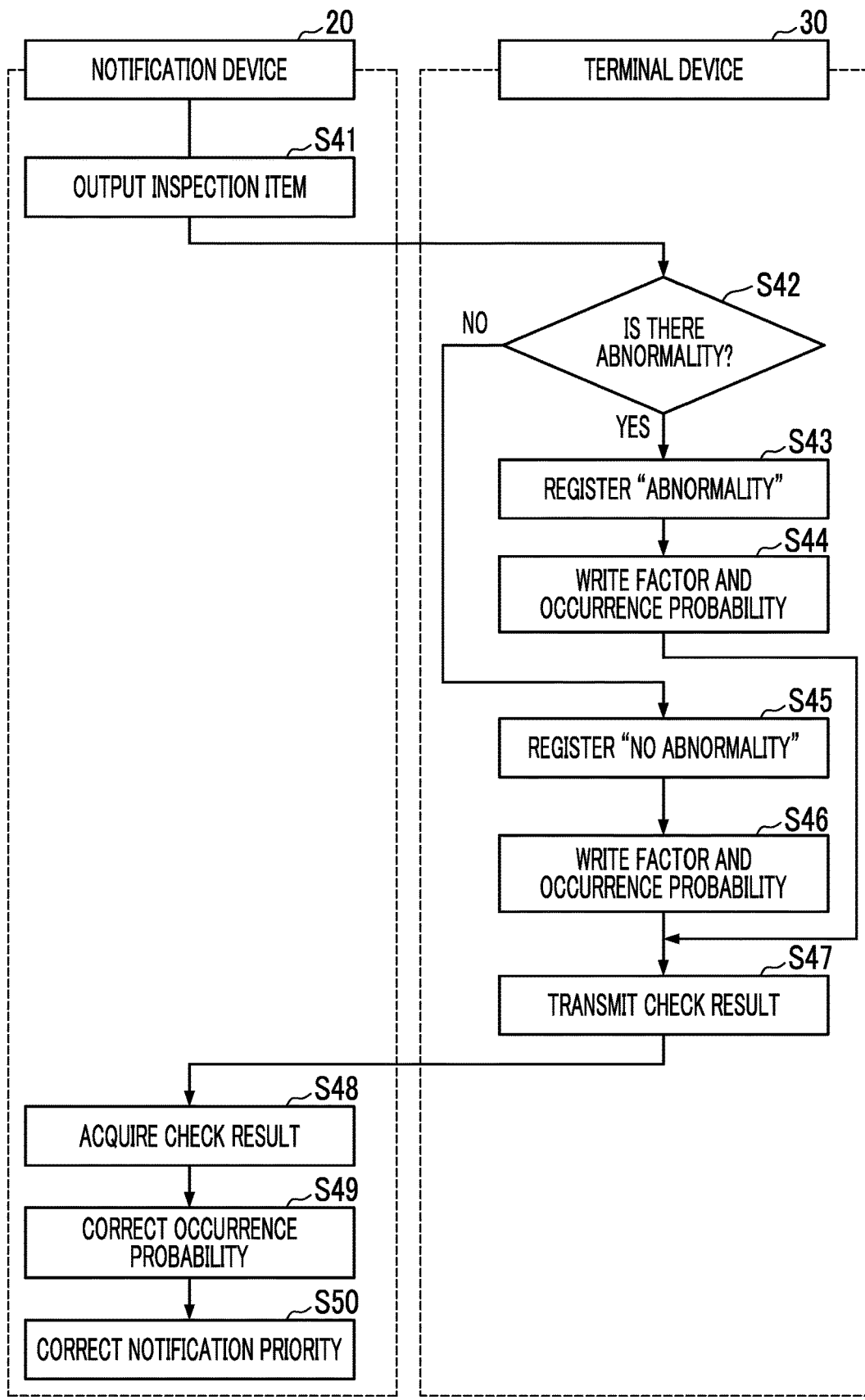
FIG. 11C is a third diagram showing a processing flow of the plant management system according to the first embodiment of the present invention.

The item specifying unit 203 proceeds to processing of step S41 shown in FIG. 11C in a case where determination is made that there is no item that can be checked at present (NO in step S51). Processing from step S42 to step S50 shown in FIG. 11C is performed.

The plant management system 1 according to the second embodiment of the present invention has been described above.

In the plant management system 1, the storage unit 201 stores in advance the inspection item to be checked when the plant 10 is stopped. The stop-time item specifying unit 206 specifies the inspection item to be checked at the time of stop on the basis of the inspection item to be checked at the time of stop of the plant 10 stored in advance in the storage unit 201.

Since the inspection item, to be checked when the plant 10 is stopped, is specified in advance, the inspection item that is difficult for the plant manager to check can be excluded in advance, and thus the plant manager can efficiently proceed with the check work.

The order of the processing in the embodiments of the present invention may be changed within a range in which appropriate processing is performed.

Each of the storage unit 201 and other storage devices according to the embodiments of the present invention may be provided anywhere within a range in which appropriate information is transmitted and received. A plurality of storage units 201 and a plurality of other storage devices may exist within a range in which appropriate information is transmitted and received and may store the data in a distributed manner.

Although the embodiments of the present invention have been described, the plant management system 1, the plant 10, the notification device 20, the terminal device 30, and other control devices described above may have a computer system inside. The steps of the processing described above are stored in a computer-readable recording medium in the form of a program, and the computer reads and executes the program to perform the processing described above. A specific example of the computer is shown below.

Figure 13:
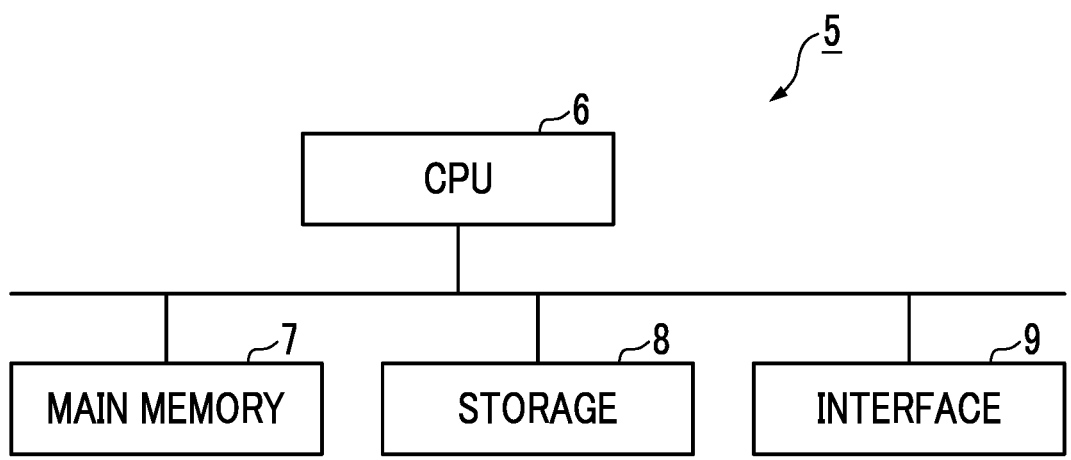
FIG. 13 is a schematic block diagram showing a configuration of a computer according to at least one embodiment.

FIG. 13 is a schematic block diagram showing a configuration of a computer according to at least one embodiment.

As shown in FIG. 13, a computer 5 includes a CPU 6, a main memory 7, a storage 8, and an interface 9.

For example, each of the plant management system 1, the plant 10, the notification device 20, the terminal device 30, and other control devices described above is mounted on the computer 5. The operation of each processing unit described above is stored in the storage 8 in the form of a program. The CPU 6 reads the program from the storage 8, expands the program in the main memory 7, and executes the above processing according to the program. The CPU 6 secures a storage area corresponding to each of the storage units described above in the main memory 7 according to the program.

Examples of the storage 8 include a hard disk drive (HDD), a solid state drive (SSD), a magnetic disk, a magneto-optical disk, a compact disc read only memory (CD-ROM), a digital versatile disc read only memory (DVD-ROM), and a semiconductor memory. The storage 8 may be an internal medium directly connected to a bus of the computer 5 or may be an external medium connected to the computer 5 through the interface 9 or a communication line. In a case where the program is distributed to the computer 5 through the communication line, the computer 5 that receives the distribution may expand the program into the main memory 7 and execute the above processing. In at least one embodiment, the storage 8 is a non-transitory tangible storage medium.

The above program may realize a part of the functions described above. Further, the program may be a file that can realize the functions described above in combination with a program already recorded in the computer system, that is, a so-called difference file (difference program).

Although some embodiments of the present invention have been described, these embodiments are examples and do not limit the scope of the invention. Various additions, omissions, replacements, and changes may be made to these embodiments within a scope not departing from the spirit of the invention.

INDUSTRIAL APPLICABILITY

With the notification device, the notification method, and the program according to the embodiment of the present invention, it is possible for the person in charge of inspection to recognize the inspection item to be inspected.

REFERENCE SIGNS LIST

1: plant management system
10: plant
20: notification device
30, 30a: terminal device
101, 101a1, 101a2, 101a3, 101an: sensor
102: data transmission unit
201: storage unit
202: abnormality estimation unit
203: item specifying unit
204: information update unit
205: notification unit
206: stop-time item specifying unit
207: check result acquisition unit
208: learning unit
209: stop-time item output unit
210: notification display changing unit
301: communication unit
302: display unit
303: display control unit
304: input unit
305: database writing unit
306: display changing reception unit

The invention claimed is:

1. A notification device comprising:
an abnormality estimation unit for estimating a state relating to an abnormality of a plant and a factor relating to the abnormality of the plant;
an item specifying unit for specifying an inspection item on the basis of the state relating to the abnormality of the plant and of the factor relating to the abnormality of the plant estimated by the abnormality estimation unit;
a notification unit for notifying of the inspection item specified by the item specifying unit;
a stop-time item specifying unit for specifying the inspection item to be checked at a time of stop out of the inspection items specified by the item specifying unit;
a check result acquisition unit for receiving a check result for the inspection item of which the notification unit sends notification; and
a stop-time item output unit for outputting the inspection item to be checked at the time of stop.

2. The notification device according to claim 1,
wherein the stop-time item specifying unit specifies the inspection item to be checked at the time of stop on the basis of the check result.

3. The notification device according to claim 1, further comprising:
a storage unit for storing the inspection item to be checked at the time of stop in advance,
wherein the stop-time item specifying unit specifies the inspection item to be checked at the time of stop on the basis of the inspection item to be checked at the time of stop, which is stored in the storage unit in advance.

4. The notification device according to claim 1, further comprising:
a learning unit for correcting an occurrence probability of the factor relating to the abnormality of the plant on the basis of the check result.

5. The notification device according to claim 4,
wherein the abnormality estimation unit
estimates the state relating to the abnormality of the plant on the basis of a sensor value detected by a sensor provided in the plant, and
specifies the factor relating to the abnormality of the plant on the basis of the state relating to the abnormality of the plant and of the occurrence probability corrected by the learning unit.

6. The notification device according to claim 5,
wherein the sensor value includes a past sensor value detected by the sensor.

7. The notification device according to claim 1, further comprising:

an information update unit for updating website information related to the inspection item specified by the item specifying unit out of website information displayed on a website.

8. The notification device according to claim 7, further comprising:
a check order specifying unit for specifying a check order in which the inspection item is checked on the basis of log information related to the check result; and
a priority determination unit for determining priority of displaying the inspection item on the basis of the check order.

9. A notification method comprising:
estimating a state relating to an abnormality of a plant and a factor relating to the abnormality of the plant using an abnormality estimation unit;
specifying an inspection item on the basis of the state relating to the abnormality of the plant and of the estimated factor relating to the abnormality of the plant using an item specifying unit;
notifying of the specified inspection item using a notification unit;
specifying the inspection item to be checked at a time of stop out of the specified inspection items using a stop-time item specifying unit;
receiving a check result for the inspection item of which notification has been sent using a check result acquisition unit; and
outputting the inspection item to be checked at the time of stop using a stop-time item output unit.

10. The notification method according to claim 9, further comprising:
specifying the inspection item to be checked at the time of stop on the basis of the check result.

11. The notification method according to claim 9, further comprising:
storing the inspection item to be checked at the time of stop in advance; and
specifying the inspection item to be checked at the time of stop on the basis of the inspection item to be checked at the time of stop, which is stored in advance.

12. The notification method according to claim 9, further comprising:
correcting an occurrence probability of the factor relating to the abnormality of the plant on the basis of the check result.

13. The notification method according to claim 9, further comprising:
specifying a check order in which the inspection item is checked on the basis of log information related to the check result; and
determining priority of displaying the inspection item on the basis of the check order.

14. A non-transitory computer readable media including a program causing a computer to execute
estimating a state relating to an abnormality of a plant and a factor relating to the abnormality of the plant using an abnormality estimation unit;
specifying an inspection item on the basis of the state relating to the abnormality of the plant and of the estimated factor relating to the abnormality of the plant using an item specifying unit;
notifying of the specified inspection item using a notification unit;
specifying the inspection item to be checked at a time of stop out of the specified inspection items using a stop-time item specifying unit;
receiving a check result for the inspection item of which notification has been sent using a check result acquisition unit; and
outputting the inspection item to be checked at the time of stop using a stop-time item output unit.

* * * * *